United States Patent
Niemi et al.

(10) Patent No.: US 10,939,347 B2
(45) Date of Patent: Mar. 2, 2021

(54) APPLICATION OF NAS-LEVEL CONGESTION CONTROL TIMER VALUES AT INTERSYSTEM CHANGE

(71) Applicant: MediaTek Singapore Pte. Ltd., Singapore (SG)

(72) Inventors: Marko Niemi, Oulu (FI); Matti Moisanen, Oulu (FI)

(73) Assignee: MediaTek Singapore Pte. Ltd., Singapore (SG)

(*) Notice: Subject to any disclaimer, the term of this patent is extended or adjusted under 35 U.S.C. 154(b) by 0 days.

(21) Appl. No.: 16/250,583

(22) Filed: Jan. 17, 2019

(65) Prior Publication Data
US 2019/0159095 A1 May 23, 2019

Related U.S. Application Data

(60) Provisional application No. 62/618,101, filed on Jan. 17, 2018.

(51) Int. Cl.
*H04W 4/00* (2018.01)
*H04W 36/22* (2009.01)
(Continued)

(52) U.S. Cl.
CPC ....... *H04W 36/22* (2013.01); *H04W 36/0022* (2013.01); *H04W 36/14* (2013.01); *H04W 84/042* (2013.01)

(58) Field of Classification Search
USPC .... 370/229, 230, 230.1, 235, 236, 237, 252, 370/328, 330, 331
See application file for complete search history.

(56) References Cited

U.S. PATENT DOCUMENTS

2012/0294144 A1\* 11/2012 Niemi ............... H04W 36/0022
370/230
2013/0016607 A1\* 1/2013 Tiwari ................. H04W 28/02
370/230
(Continued)

FOREIGN PATENT DOCUMENTS

EP 2482606 A2 8/2012
WO WO 2014013661 A1 1/2014
(Continued)

OTHER PUBLICATIONS

China National Intellectual Property Administration, International Search Report and Written Opinion for International Patent Application No. PCT/CN2019/072183, dated Apr. 10, 2019.
(Continued)

*Primary Examiner* — Nguyen H Ngo
(74) *Attorney, Agent, or Firm* — Han IP PLLC; Andy M. Han

(57) ABSTRACT

Various examples pertaining to application of non-access stratum (NAS)-level congestion control timer values at intersystem change in mobile communications are described. A user equipment (UE) receives an indication of a NAS-level congestion control from a first type of wireless network. The UE starts a timer responsive to the receiving of the indication of the NAS-level congestion control. The UE then performs an intersystem change from the first type of wireless network to a second type of wireless network different from the first type by utilizing the timer.

20 Claims, 13 Drawing Sheets

(51) Int. Cl.
*H04W 36/00* (2009.01)
*H04W 36/14* (2009.01)
*H04W 84/04* (2009.01)

(56) References Cited

U.S. PATENT DOCUMENTS

| | | | | |
|---|---|---|---|---|
| 2014/0355417 | A1* | 12/2014 | Kim | H04L 41/0654 370/221 |
| 2015/0181462 | A1* | 6/2015 | Iwai | H04W 28/16 370/229 |
| 2016/0174188 | A1* | 6/2016 | Kim | H04W 68/02 455/458 |
| 2017/0094501 | A1* | 3/2017 | Huang-Fu | H04W 8/183 |
| 2017/0196028 | A1* | 7/2017 | Iwai | H04W 24/02 |
| 2018/0098276 | A1* | 4/2018 | Livanos | H04W 4/025 |
| 2018/0331944 | A1* | 11/2018 | Salkintzis | H04L 45/38 |
| 2019/0053252 | A1* | 2/2019 | Park | H04L 47/826 |
| 2019/0166517 | A1* | 5/2019 | Niemi | H04W 60/005 |
| 2019/0342821 | A1* | 11/2019 | Kim | H04W 76/18 |

FOREIGN PATENT DOCUMENTS

| | | |
|---|---|---|
| WO | WO 2017010846 A1 | 1/2017 |
| WO | WO 2017138780 A1 | 8/2017 |

OTHER PUBLICATIONS

Taiwan Intellectual Property Office, Office Action for Taiwan Patent Application No. 108101867, dated Nov. 29, 2019.

\* cited by examiner

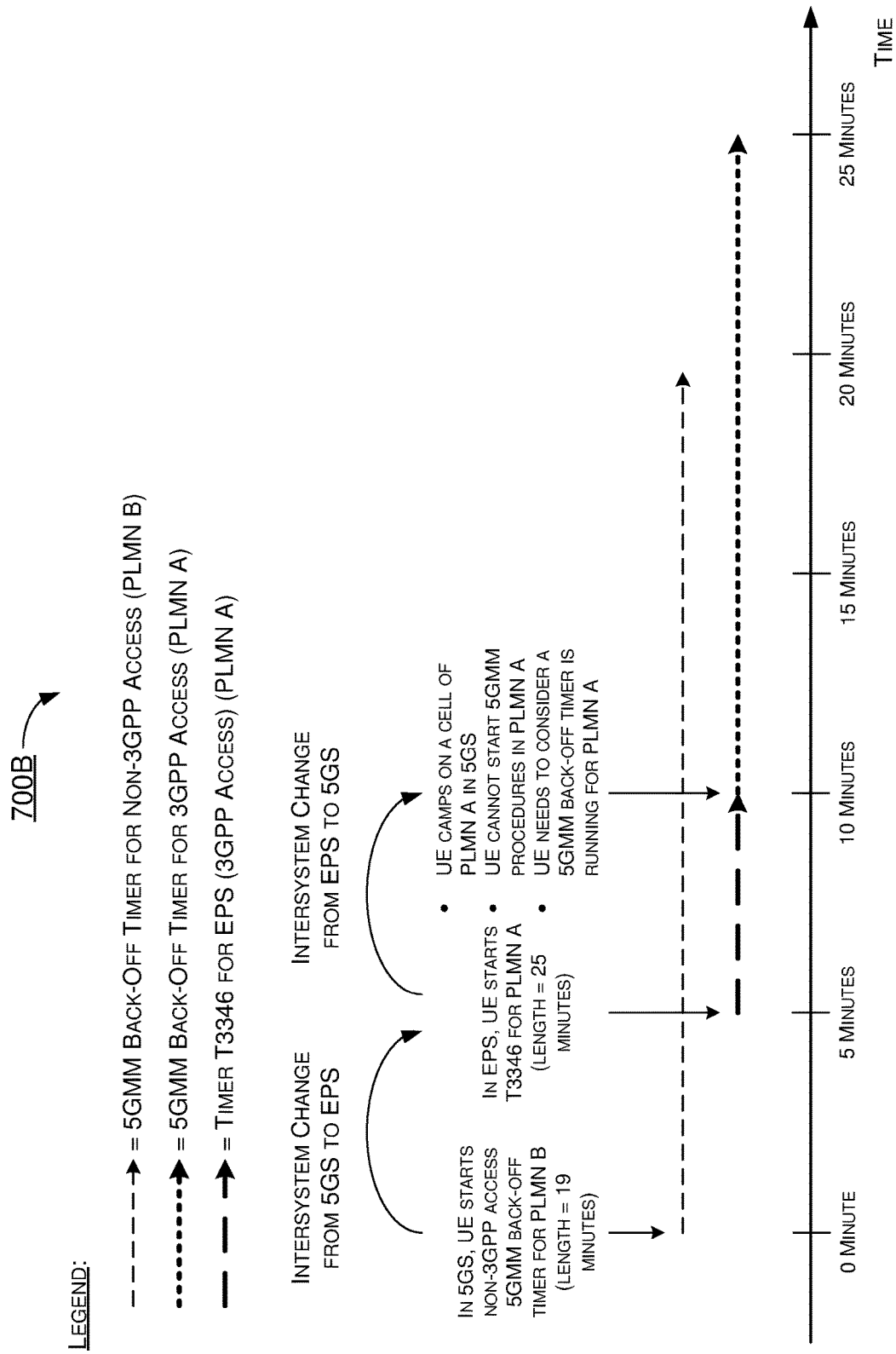

APPLICATION OF NAS-LEVEL CONGESTION CONTROL TIMER VALUES AT INTERSYSTEM CHANGE

CROSS REFERENCE TO RELATED PATENT APPLICATION(S)

The present disclosure is part of a non-provisional application claiming the priority benefit of U.S. Patent Application No. 62/618,101, filed on 17 Jan. 2018, the content of which is herein incorporated by reference in its entirety.

TECHNICAL FIELD

The present disclosure is generally related to mobile communications and, more particularly, to applying non-access stratum (NAS)-level congestion control timer values at intersystem change in mobile communications.

BACKGROUND

Unless otherwise indicated herein, approaches described in this section are not prior art to the claims listed below and are not admitted as prior art by inclusion in this section.

The current $3^{rd}$-Generation Partnership Project (3GPP) specification for $5^{th}$-Generation (5G)/New Radio (NR) mobile communications provides a general NAS-level congestion control mechanism to handle $5^{th}$-Generation Mobility Management (5GMM) signaling congestion. Under the 3GPP specification, if a user equipment (UE) enters a new Public Land Mobile Network (PLMN) while a 5GMM congestion control timer ($T_{mm}$) is running, and the new PLMN is not equivalent to a PLMN where the UE started the 5GMM congestion control timer $T_{mm}$, the UE is to stop timer $T_{mm}$ when initiating mobility management procedures in the new PLMN. Moreover, the same packet-switching (PS) domain back-off timer T3346 is used between $3^{rd}$-Generation (3G) and $4^{th}$-Generation (4G) mobile networks because of similar requirement in 5G mobile networks. That is, if the UE connects to a 4G network and does not change its PLMN, then the UE cannot initiate an attach, a tracking area update (TAU) and service request procedure while the back-off timer is running. The back-off timer is stopped when a new PLMN, which is not an equivalent PLMN, is accessed. With respect to mobility management congestion control in a $5^{th}$-Generation System (5GS) and an Evolved Packet System (EPS), the same NAS-level congestion control timer T3346, which is used in an Evolved Packet Core (EPC) of the EPS, cannot be used in 5GS.

However, it is not defined in the current 3GPP specification regarding whether any running 5GMM back-off timer should also be applicable to EPS. It is also not defined in the current 3GPP specification as to whether an EPS Mobility Management (EMM) back-off timer should also be applicable to 5GS (e.g., 3GPP or non-3GPP). Moreover, it is not defined in the current 3GPP specification how the value of an EPS NAS-level back-off timer T3346 is derived when a 5GMM back-off timer is running in the UE (either in 3GPP or non-3GPP access-specific 5GMM instance) and the UE performs an intersystem change from 5GS to EPS. Furthermore, it is not defined in the current 3GPP specification how the value of a 5GMM NAS-level back-off timer (either for 3GPP or non-3GPP access-specific 5GMM instance) is derived when a T3346 back-off timer in EPS is running in the UE and the UE performs an intersystem change from EPS to 5GS.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one aspect, a method may involve a processor of a user equipment (UE) receiving an indication of a NAS-level congestion control from a first type of wireless network. The method may also involve the processor starting a timer responsive to the receiving of the indication of the NAS-level congestion control. The method may further involve the processor performing an intersystem change from the first type of wireless network to a second type of wireless network different from the first type by utilizing the timer.

In one aspect, an apparatus may include a transceiver capable of wirelessly communicating with different types of wireless networks of different radio access technologies (RATs). The apparatus may also include a processor communicatively coupled to the transceiver. The processor may be capable of receiving, via the transceiver, an indication of a NAS-level congestion control from a first type of wireless network of the different types of wireless networks. The processor may also be capable of starting a timer responsive to the receiving of the indication of the NAS-level congestion control. The processor may further be capable of performing an intersystem change from the first type of wireless network to a second type of wireless network different from the first type by utilizing the timer.

It is noteworthy that, although description provided herein may be in the context of certain radio access technologies, networks and network topologies such as 5G/NR, the proposed concepts, schemes and any variation(s)/derivative(s) thereof may be implemented in, for and by other types of radio access technologies, networks and network topologies such as, for example and without limitation, Universal Terrestrial Radio Access Network (UTRAN), Global System for Mobile communications (GSM), General Packet Radio Service (GPRS)/Enhanced Data rates for Global Evolution (EDGE) Radio Access Network (GERAN), Long-Term Evolution (LTE), LTE-Advanced, LTE-Advanced Pro, Internet-of-Things (IoT) and Narrow Band Internet of Things (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 7B is a diagram of an example scenario of intersystem change from 5GS to EPS and back to 5GS in accordance with an implementation of the present disclosure.

DETAILED DESCRIPTION OF PREFERRED IMPLEMENTATIONS

Figure 1:
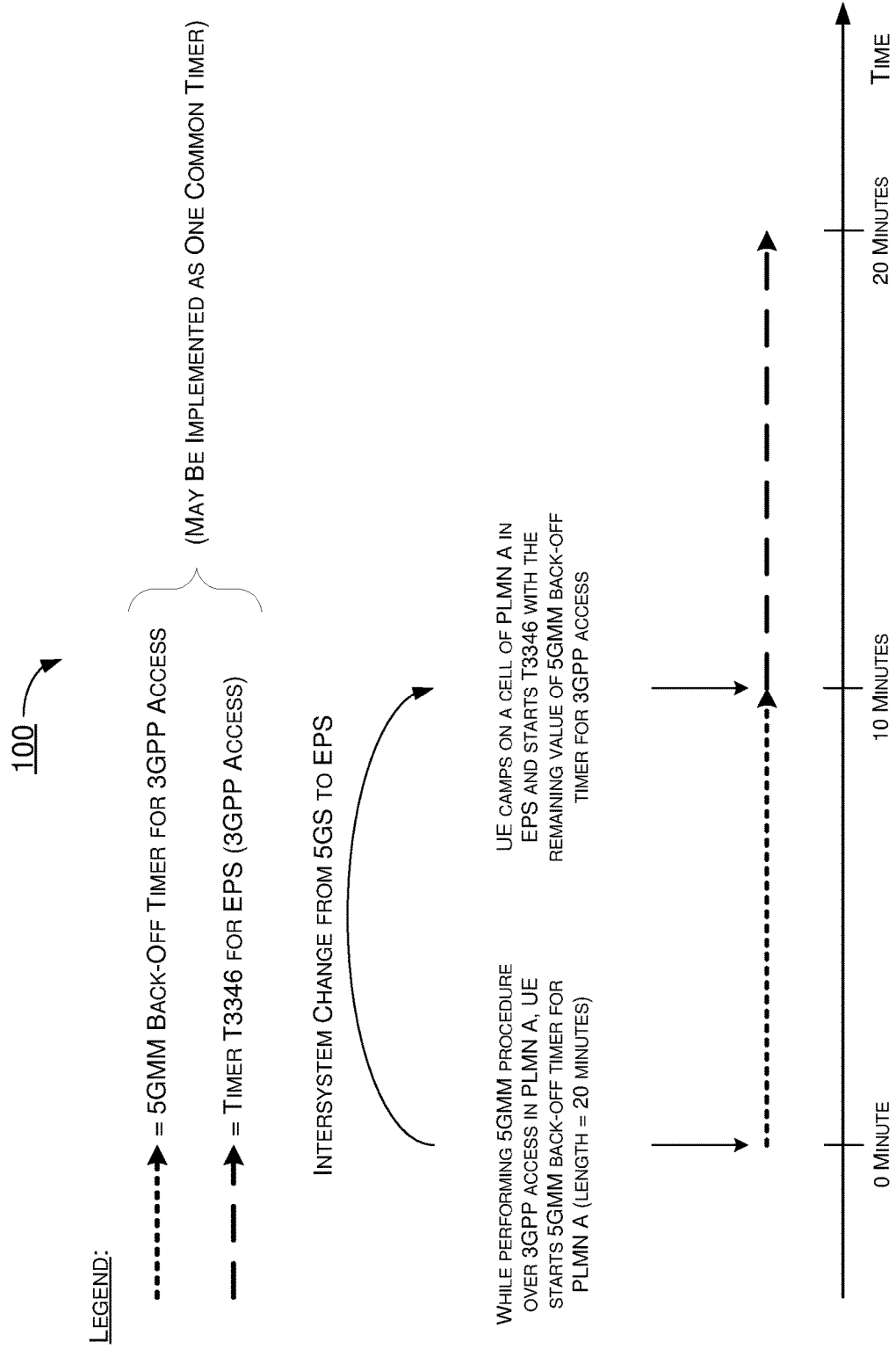
FIG. 1 is a diagram of an example scenario of intersystem change from 5GS to EPS in accordance with an implementation of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to applying NAS-level congestion control timer values at intersystem change in mobile communications. According to the present disclosure, a number of possible schemes and solutions may be implemented separately or jointly. That is, although these possible solutions may be described below separately, two or more of these possible solutions may be implemented in one combination or another. It is noteworthy that, although description provided herein may be in the context of intersystem change between 5GS and EPS, the proposed schemes and solutions also apply to intersystem changes between 5GS and UTRAN or GERAN.

Under a proposed scheme in accordance with the present disclosure, a UE may maintain a back-off timer (e.g., timer T3346) which is common for both EPS an 5GS. Under another proposed scheme in accordance with the present disclosure, with respect to how to start, derive and maintain back-off timer values (e.g., between 3GPP access and non-3GPP access (in 5G)) at intersystem change, either of a first approach and a second approach may be taken depending on the situation.

Under a first approach, when the UE performs intersystem change from 5GS to EPS over 3GPP access, the UE may start back-off timer T3346 in EPS. In an event that the PLMN selected in EPS is the same as or equivalent to the PLMN associated with any 5GMM back-off timer (e.g., the timer may be running either in 3GPP or non-3GPP 5GMM instance), back-off timer T3346 for EPS may be started with a value derived from the corresponding 5GMM back-off timer.

Alternatively, the UE may maintain one common timer (e.g., T3346) for 3GPP access that is applicable for both 5GS and EPS and which is still running when the UE changes from 5GS to EPS. However, in such cases, in an event that the running 5GMM back-off timer is for non-3GPP instance and the intersystem change is performed over 3GPP access, then the remaining value of non-3GPP 5GMM back-off timer would need to be derived into T3346 for EPS. Optionally, in an event that the network has explicitly indicated to the UE that 5GMM back-off time is also applicable to EPS in the current PLMN and/or an equivalent PLMN (ePLMN), then the back-off timer T3346 for EPS may be started with a remaining value of the 5GMM back-off timer.

Under a second approach, when the UE performs intersystem change from EPS to 5GS over 3GPP access, the UE may start a 5GMM back-off timer. In an event that the PLMN selected in 5GS is the same as or equivalent to the PLMN associated with back-off timer T3346 running in EPS, then the 5GMM back-off timer for 3GPP access may be started with the remaining value of the back-off timer T3346. In an event that the UE supports non-3GPP access in 5GS and maintains a separate 5GMM back-off timer for non-3GPP 5GMM instance, then the UE may also start the separately maintained 5GMM back-off timer.

Alternatively, the UE may maintain one common timer (e.g., T3346) for 3GPP access that is applicable to both 5GS and EPS and which is still running when the UE changes from EPS to 5GS. However, in such cases, in an event that non-3GPP access is supported in 5GS, the remaining value of T3346 running in EPS may need to be derived into the 5GMM back-off timer for non-3GPP access in 5GS. Optionally, in an event that the network has explicitly indicated to the UE that T3346 applies also to 5GS in the current PLMN and/or its ePLMN, then the 5GMM back-off timer may be started with a remaining value of T3346 running in EPS.

Illustrative Scenarios

To aid better appreciation of the various proposed schemes and approaches, a number of illustrative and non-limiting example scenarios are provided below and described with reference to FIG. 1~FIG. 8.

FIG. 1 illustrates an example scenario 100 of intersystem change from 5GS to EPS in accordance with an implementation of the present disclosure. In scenario 100, while performing 5GMM procedure(s) over 3GPP access in a first PLMN (denoted as "PLMN A" in FIG. 1), a UE may start a 5GMM back-off timer for PLMN A (e.g., with a length of 20 minutes). As the UE performs an intersystem change from 5GS to EPS, the UE may camp on a cell of PLMN A in EPS and the UE may also start a timer T3346 with the remaining value of the 5GMM back-off timer for 3GPP access. It is noteworthy that, in scenario 100, the 5GMM back-off timer for 3GPP access and the timer T3346 for EPS may be implemented by one common timer.

Figure 2:
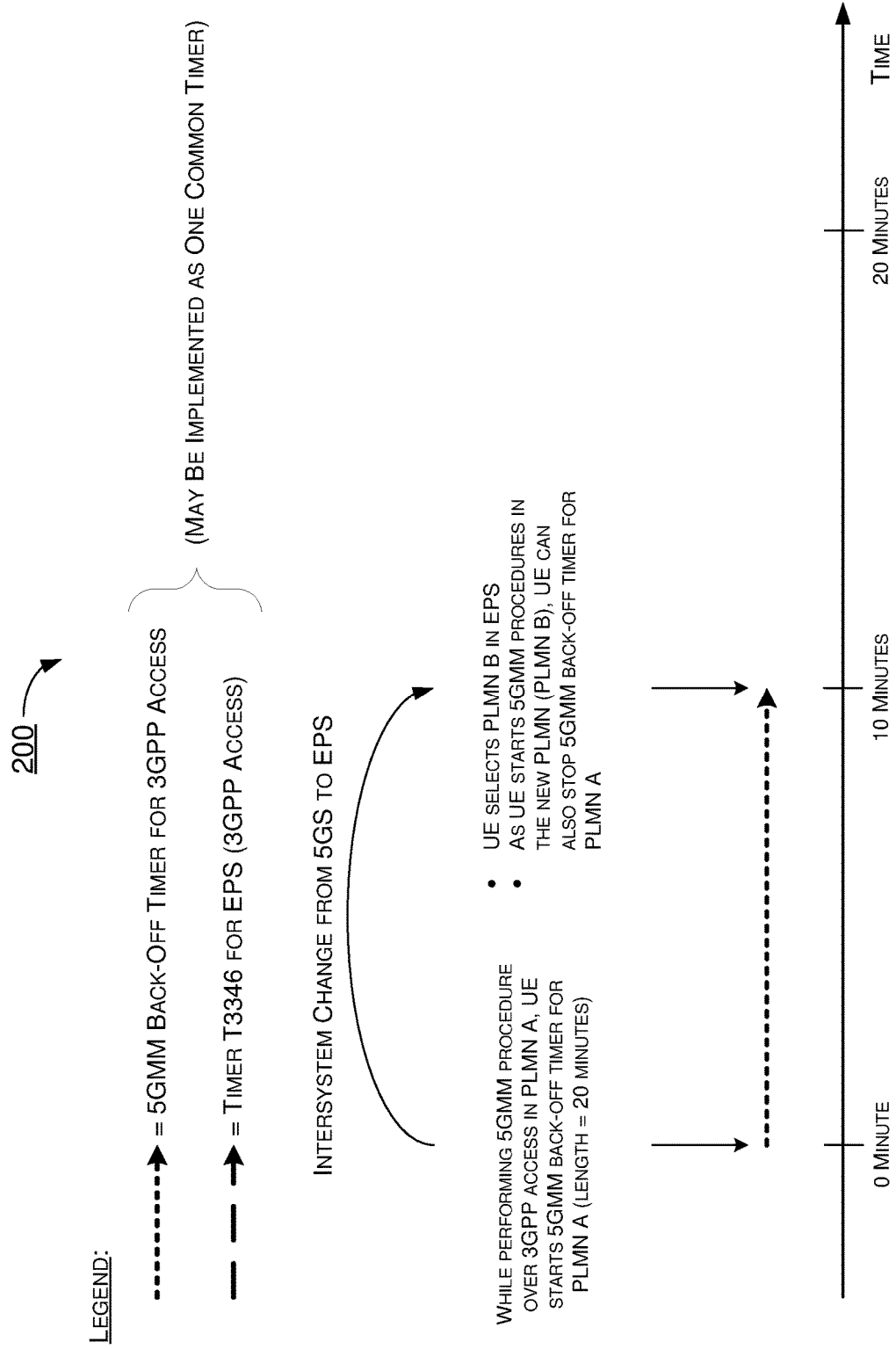
FIG. 2 is a diagram of an example scenario of intersystem change from 5GS to EPS in accordance with an implementation of the present disclosure.

FIG. 2 illustrates an example scenario 200 of intersystem change from 5GS to EPS in accordance with an implementation of the present disclosure. In scenario 200, while performing 5GMM procedure(s) over 3GPP access in a first PLMN (denoted as "PLMN A" in FIG. 2), a UE may start a 5GMM back-off timer for PLMN A (e.g., with a length of 20 minutes). As the UE performs an intersystem change from 5GS to EPS, the UE may select a second PLMN (denoted as "PLMN B" in FIG. 2) in EPS. As the UE may start 5GMM procedures in the new PLMN, namely PLMN B, the UE may also stop the 5GMM back-off timer for PLMN A. It is noteworthy that, in scenario 200, the 5GMM back-off timer for 3GPP access and the timer T3346 for EPS may be implemented by one common timer.

Figure 3:
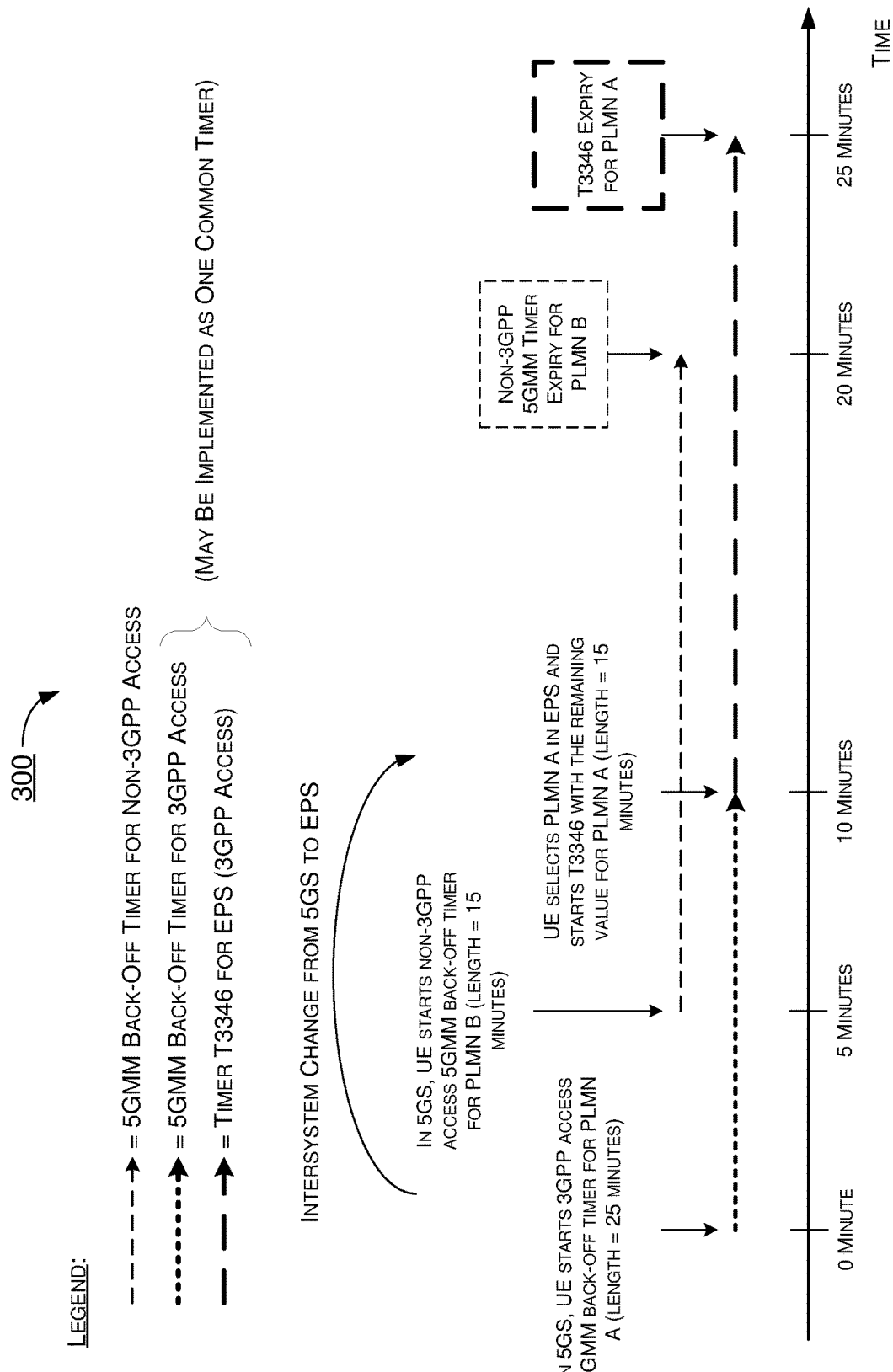
FIG. 3 is a diagram of an example scenario of intersystem change from 5GS to EPS in accordance with an implementation of the present disclosure.

FIG. 3 illustrates an example scenario 300 of intersystem change from 5GS to EPS in accordance with an implementation of the present disclosure. In scenario 300, in 5GS a UE may start a 3GPP access 5GMM back-off timer for a first PLMN (denoted as "PLMN A" in FIG. 3) (e.g., with a length of 25 minutes). Moreover, in 5GS the UE may start a non-3GPP access 5GMM back-off timer for a second PLMN (denoted as "PLMN B" in FIG. 3) (e.g., with a length of 15 minutes). As the UE performs an intersystem change from 5GS to EPS, the UE may select PLMN A in EPS and the UE may start a timer T3346 with the remaining value for PLMN A (e.g., 15 minutes). At the end of the 15-minute period, the non-3GPP 5GMM back-off timer may expire for PLMN B. At the end of the 25-minute period, the timer T3346 may expire for PLMN A. It is noteworthy that, in scenario 300, the 5GMM back-off timer for 3GPP access and the timer T3346 for EPS may be implemented by one common timer.

Figure 4:
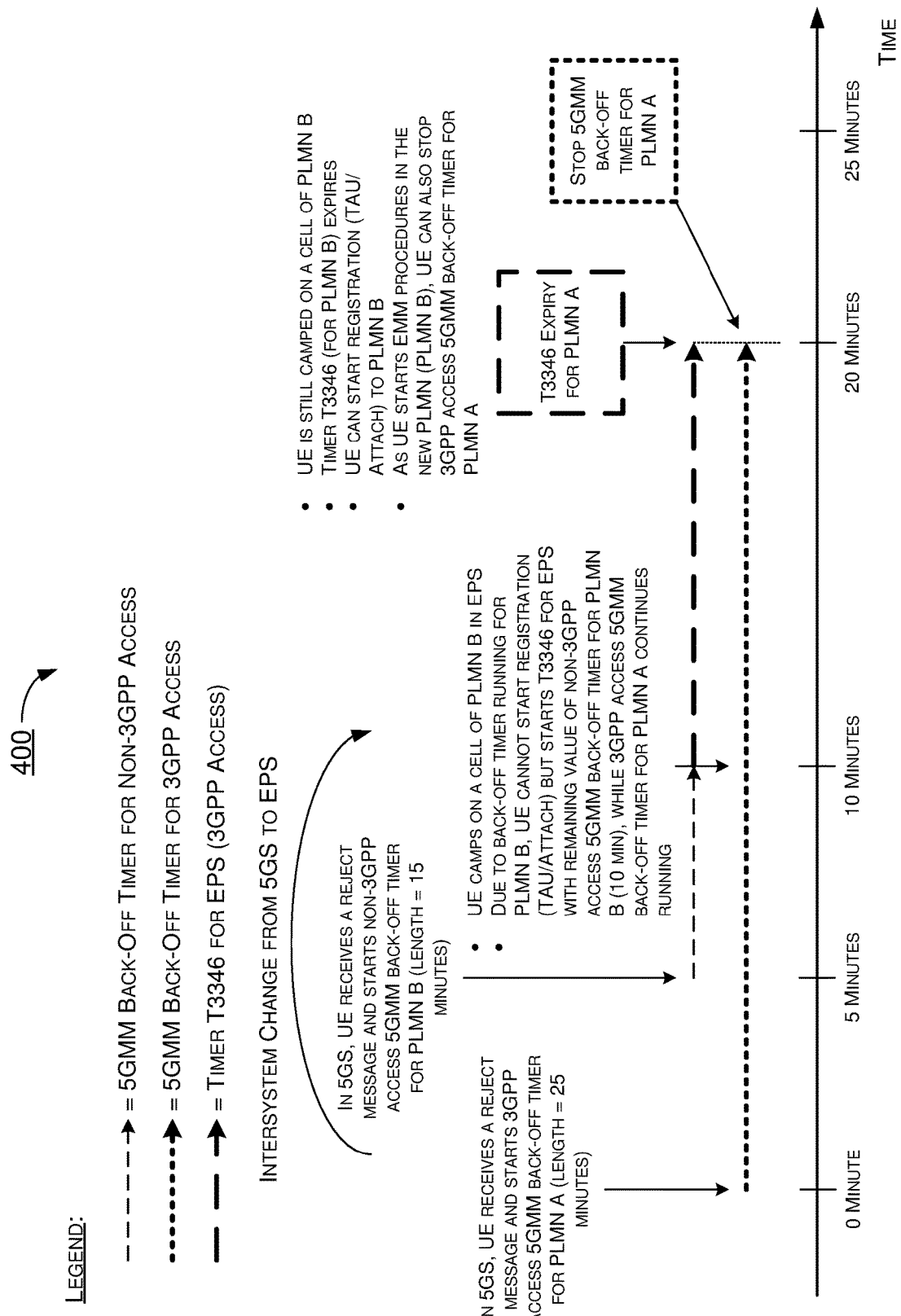
FIG. 4 is a diagram of an example scenario of intersystem change from 5GS to EPS in accordance with an implementation of the present disclosure.

FIG. 4 illustrates an example scenario 400 of intersystem change from 5GS to EPS in accordance with an implementation of the present disclosure. In scenario 400, in 5GS a UE may receive a reject message and start a 3GPP access 5GMM back-off timer for a first PLMN (denoted as "PLMN A" in FIG. 4) (e.g., with a length of 25 minutes). In 5GS the UE may receive another reject message and start a non-3GPP access 5GMM back-off timer for a second PLMN (denoted as "PLMN B" in FIG. 4) (e.g., with a length of 15 minutes). As the UE performs an intersystem change from 5GS to EPS, the UE may camp on a cell of PLMN B in EPS. Due to the back-off timer running for PLMN B, the UE cannot start registration (e.g., tracking area update (TAU) and/or attach) but the UE may start a timer T3346 for EPS with the remaining value of the non-3GPP access 5GMM back-off timer for PLMN B (e.g., 10 minutes). Meanwhile, the 3GPP access 5GMM back-off timer for PLMN A may continue running. At the end of the 15-minute period, the timer T3346 may expire for PLMN B. Moreover, at the end of the 20-minute period, the UE may still be camped on a cell of PLMN B. The UE may start registration (e.g., TAU/attach) to PLMN B. As the UE starts EMM procedure(s) in the new PLMN (PLMN B), the UE may also stop 3GPP access 5GMM back-off timer for PLMN A.

It is noteworthy that, in scenario 400, the UE needs to copy the remaining value of non-3GPP access 5GMM back-off timer to timer T3346 for EPS. Moreover, the UE may maintain the 3GPP access 5GMM back-off timer or a second T3346 in parallel and, additionally, back off from both PLMN A and PLMN B. It is also noteworthy that, in scenario 400, one common timer T3346 may not sufficient for EPS and 5GS for 3GPP access.

Figure 5A:
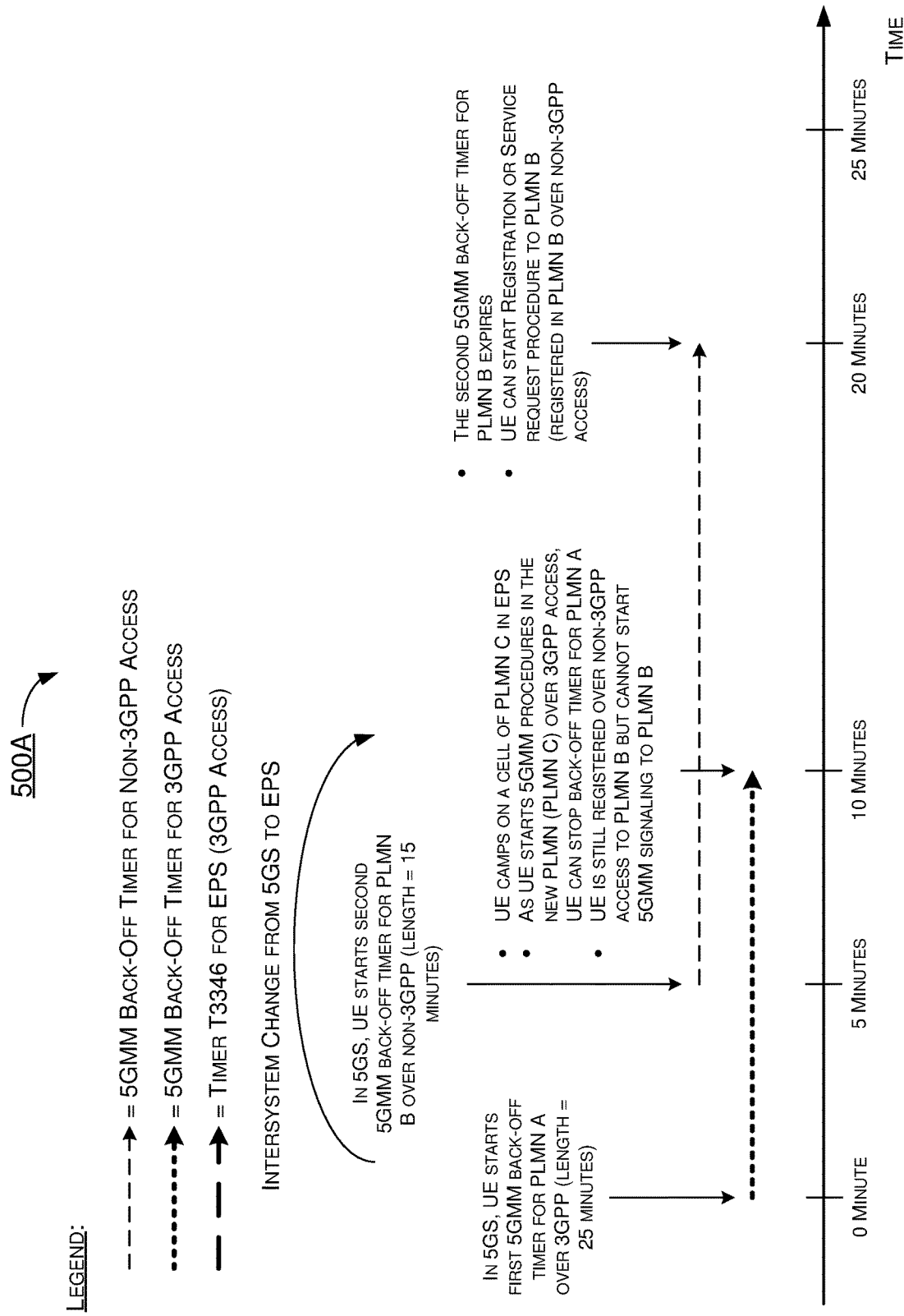
FIG. 5A is a diagram of an example scenario of intersystem change from 5GS to EPS in accordance with an implementation of the present disclosure.

FIG. 5A illustrates an example scenario 500A of intersystem change from 5GS to EPS in accordance with an implementation of the present disclosure. In scenario 500A, in 5GS a UE may start a first 5GMM back-off timer for a first PLMN (denoted as "PLMN A" in FIG. 5A) over 3GPP access (e.g., with a length of 25 minutes). In 5GS the UE may start a second 5GMM back-off timer (e.g., timer T3346) for a second PLMN (denoted as "PLMN B" in FIG. 5A) over non-3GPP access (e.g., with a length of 15 minutes). As the UE performs an intersystem change from 5GS to EPS, the UE may camp on a cell of a third PLMN (denoted as "PLMN C" in FIG. 5A) in EPS. As the UE starts 5GMM procedure(s) in the new PLMN (PLMN C) over 3GPP access, the UE may stop the back-off timer for PLMN A. The UE may still be registered over non-3GPP access to PLMN B but cannot start 5GMM signaling to PLMN B. At the end of the 15-minute period, the second 5GMM back-off timer (e.g., timer T3346) for PLMN B expires. The UE may start registration or service request procedure(s) to PLMN B (e.g., being registered in PLMN B over non-3GPP access).

Figure 5B:
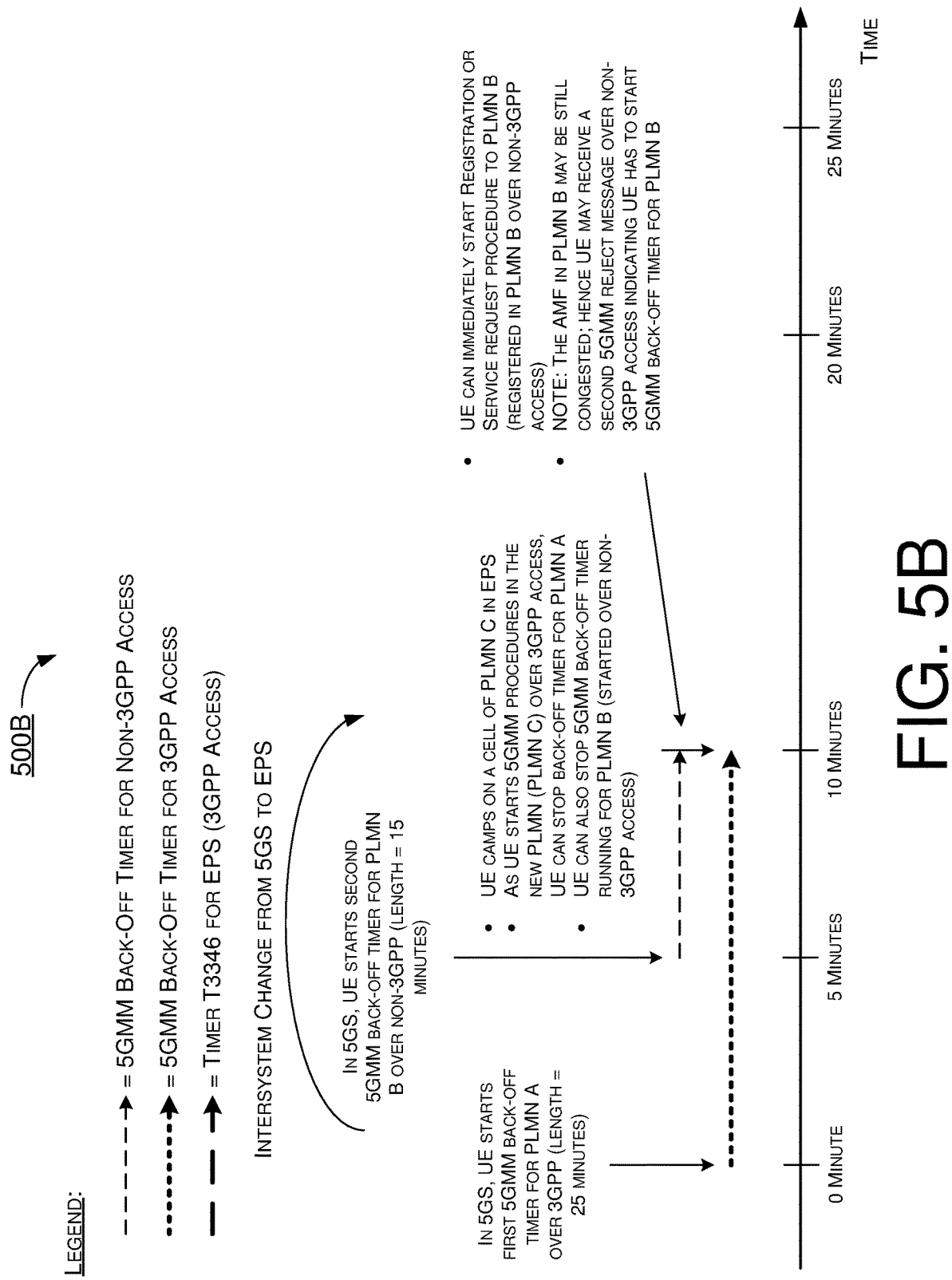
FIG. 5B is a diagram of an example scenario of intersystem change from 5GS to EPS in accordance with an implementation of the present disclosure.

FIG. 5B illustrates an example scenario 500B of intersystem change from 5GS to EPS in accordance with an implementation of the present disclosure. In scenario 500B, in 5GS a UE may start a first 5GMM back-off timer for a first PLMN (denoted as "PLMN A" in FIG. 5B) over 3GPP access (e.g., with a length of 25 minutes). In 5GS the UE may start a second 5GMM back-off timer (e.g., timer T3346) for a second PLMN (denoted as "PLMN B" in FIG. 5B) over non-3GPP access (e.g., with a length of 15 minutes). As the UE performs an intersystem change from 5GS to EPS, the UE may camp on a cell of a third PLMN (denoted as "PLMN C" in FIG. 5B) in EPS. As the UE starts 5GMM procedure(s) in the new PLMN (PLMN C) over 3GPP access, the UE may stop the back-off timer for PLMN A. The UE may also stop the 5GMM back-off timer for PLMN B, which was started over non-3GPP access. Moreover, the UE may further camp on a cell of PLMN B and is allowed now to start registration and service request procedure(s) to PLMN B (e.g., being registered in PLMN B over non-3GPP access). It is noteworthy that the access and mobility management function (AMF) in PLMN B may be still congested. Hence, the UE may receive a 5GMM reject message over non-3GPP access indicating that the UE needs to start a 5GMM back-off timer for PLMN B.

Figure 6A:
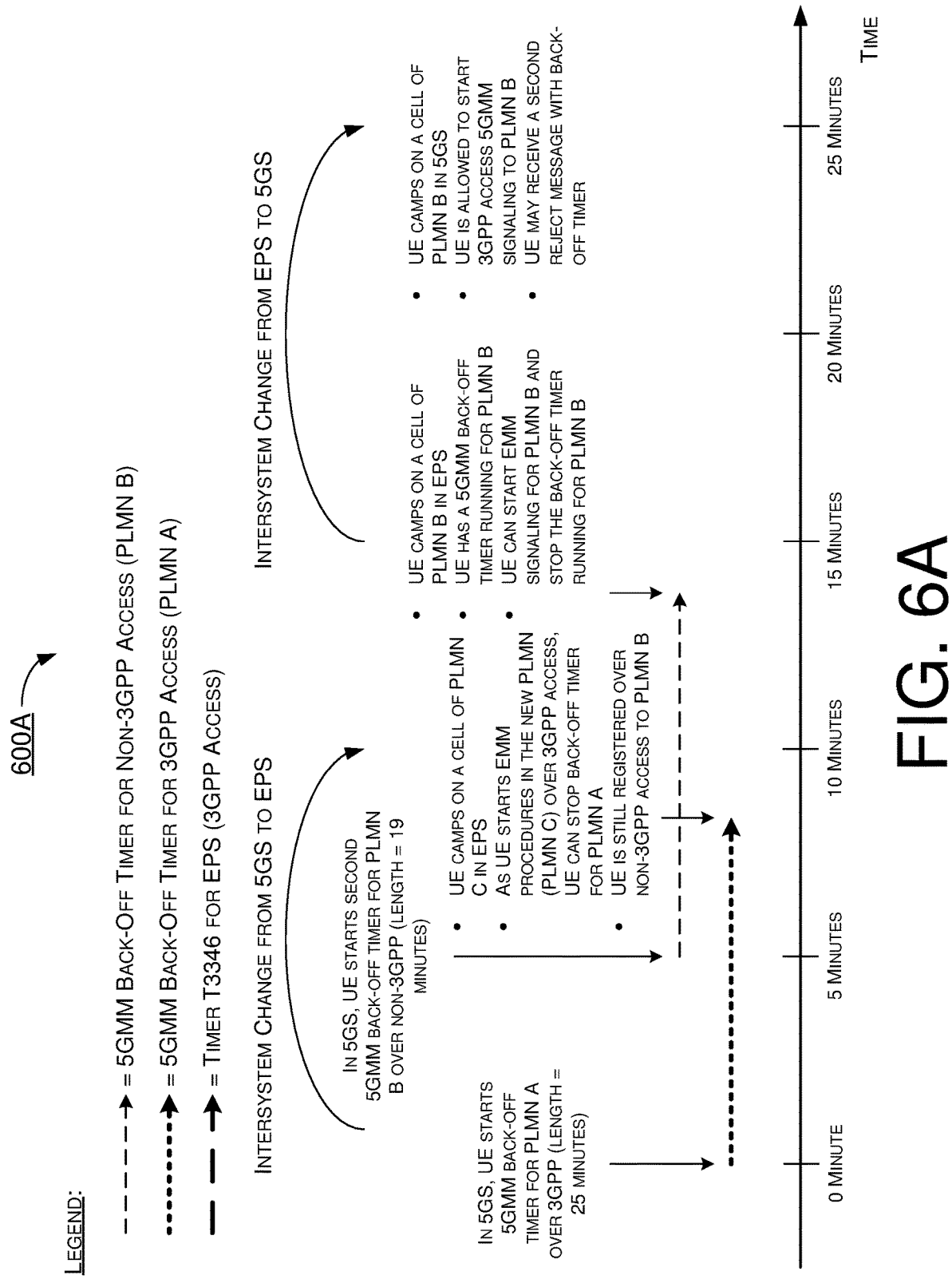
FIG. 6A is a diagram of an example scenario of intersystem change from 5GS to EPS and back to 5GS in accordance with an implementation of the present disclosure.

FIG. 6A illustrates an example scenario 600A of intersystem change from 5GS to EPS and back to 5GS in accordance with an implementation of the present disclosure. In scenario 600A, in 5GS a UE may start a first 5GMM back-off timer for a first PLMN (denoted as "PLMN A" in FIG. 6A) over 3GPP access (e.g., with a length of 25 minutes). In 5GS the UE may start a second 5GMM back-off timer for a second PLMN (denoted as "PLMN B" in FIG. 6A) over non-3GPP access (e.g., with a length of 19 minutes). As the UE performs an intersystem change from 5GS to EPS, the UE may camp on a cell of a third PLMN (denoted as "PLMN C" in FIG. 6A) in EPS. As the UE starts EMM procedure(s) in the new PLMN (PLMN C) over 3GPP access, the UE may stop the back-off timer for PLMN A. The UE may still be registered over non-3GPP access to PLMN B.

At this time, the UE may camp on a cell of PLMN B in EPS. The UE may have the second 5GMM back-off timer running for PLMN B, but no T3346 running in EPS for PLMN B and, thus, the UE may start EMM signaling for PLMN B and stop the second 5GMM back-off timer running for PLMN B. As the UE performs an intersystem change from EPS back to 5GS, the UE may camp on a cell of PLMN B in 5GS. The UE may be allowed to start 3GPP access 5GMM signaling to PLMN B. It is noteworthy that the access and mobility management function (AMF) in PLMN B may be still congested. Hence, the UE may receive a 5GMM reject message over non-3GPP access indicating that the UE needs to start a 5GMM back-off timer for PLMN B.

Figure 6B:
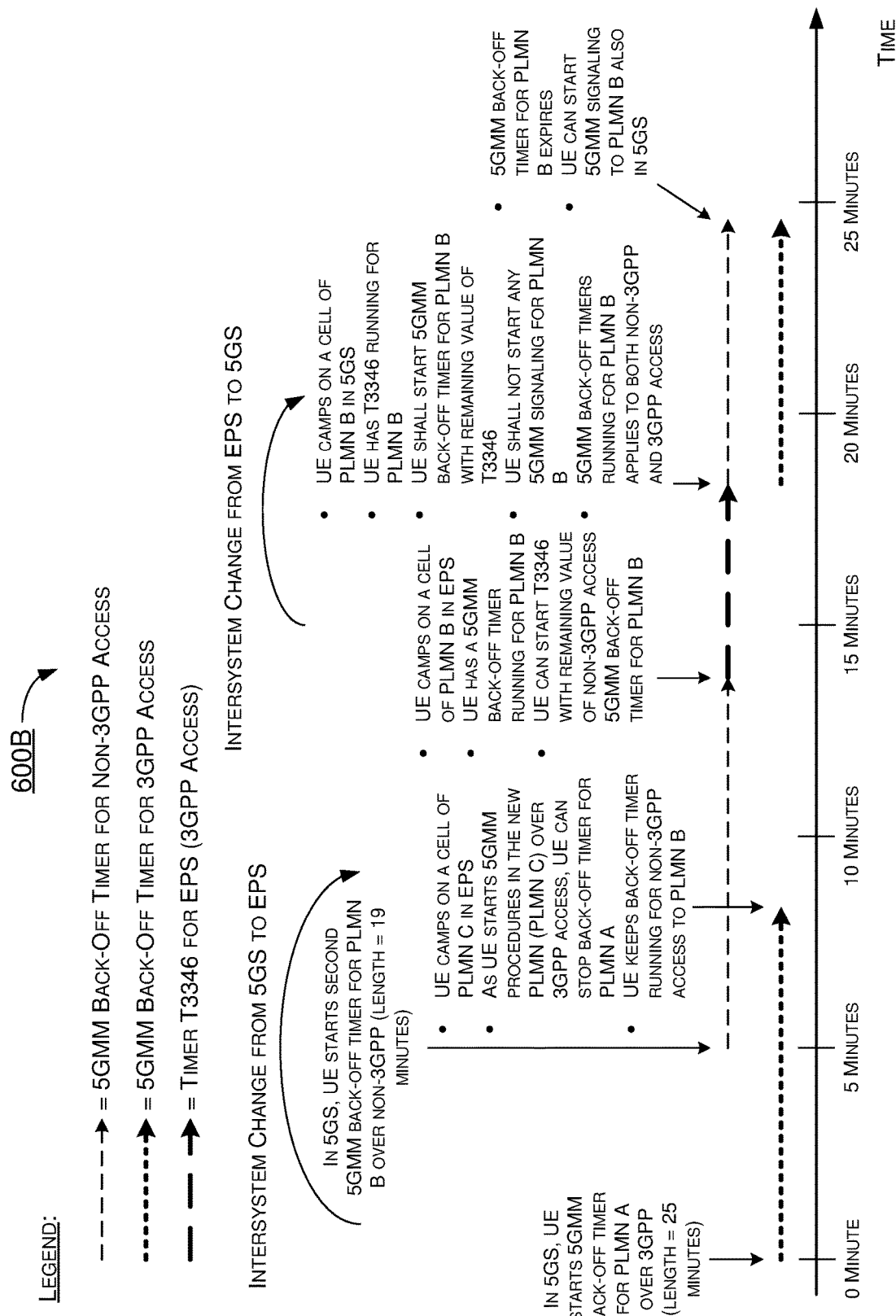
FIG. 6B is a diagram of an example scenario of intersystem change from 5GS to EPS and back to 5GS in accordance with an implementation of the present disclosure.

FIG. 6B illustrates an example scenario 600B of intersystem change from 5GS to EPS and back to 5GS in accordance with an implementation of the present disclosure. In scenario 600B, in 5GS a UE may start a first 5GMM back-off timer for a first PLMN (denoted as "PLMN A" in FIG. 6B) over 3GPP access (e.g., with a length of 25 minutes). In 5GS the UE may start a second 5GMM back-off timer for a second PLMN (denoted as "PLMN B" in FIG. 6B) over non-3GPP access (e.g., with a length of 19 minutes). As the UE performs an intersystem change from 5GS to EPS, the UE may camp on a cell of a third PLMN (denoted as "PLMN C" in FIG. 6A) in EPS. As the UE starts 5GMM procedure(s) in the new PLMN (PLMN C) over 3GPP access, the UE may stop the first 5GMM back-off timer for PLMN A. The UE may keep the second 5GMM back-off timer running for non-3GPP access to PLMN B.

At this time, the UE may be camped on a cell of PLMN B in EPS. The UE may have the second 5GMM back-off timer running for PLMN B. The UE may start timer T3346 with the remaining value of non-3GPP access 5GMM back-off timer for PLMN B. As the UE performs an intersystem change from EPS back to 5GS, the UE may camp on a cell of PLMN B in 5GS. The UE may have timer T3346 running for PLMN B. The UE may start a 5GMM back-off timer for PLMN B with the remaining value of timer T3346. The UE may not start any 5GMM signaling for PLMN B. The 5GMM back-off timer running for PLMN B may apply to both non-3GPP access and 3GPP access. When timer T3346 expires (for PLMN B), the UE may start 5GMM signaling to PLMN B in 5GS.

Figure 7A:
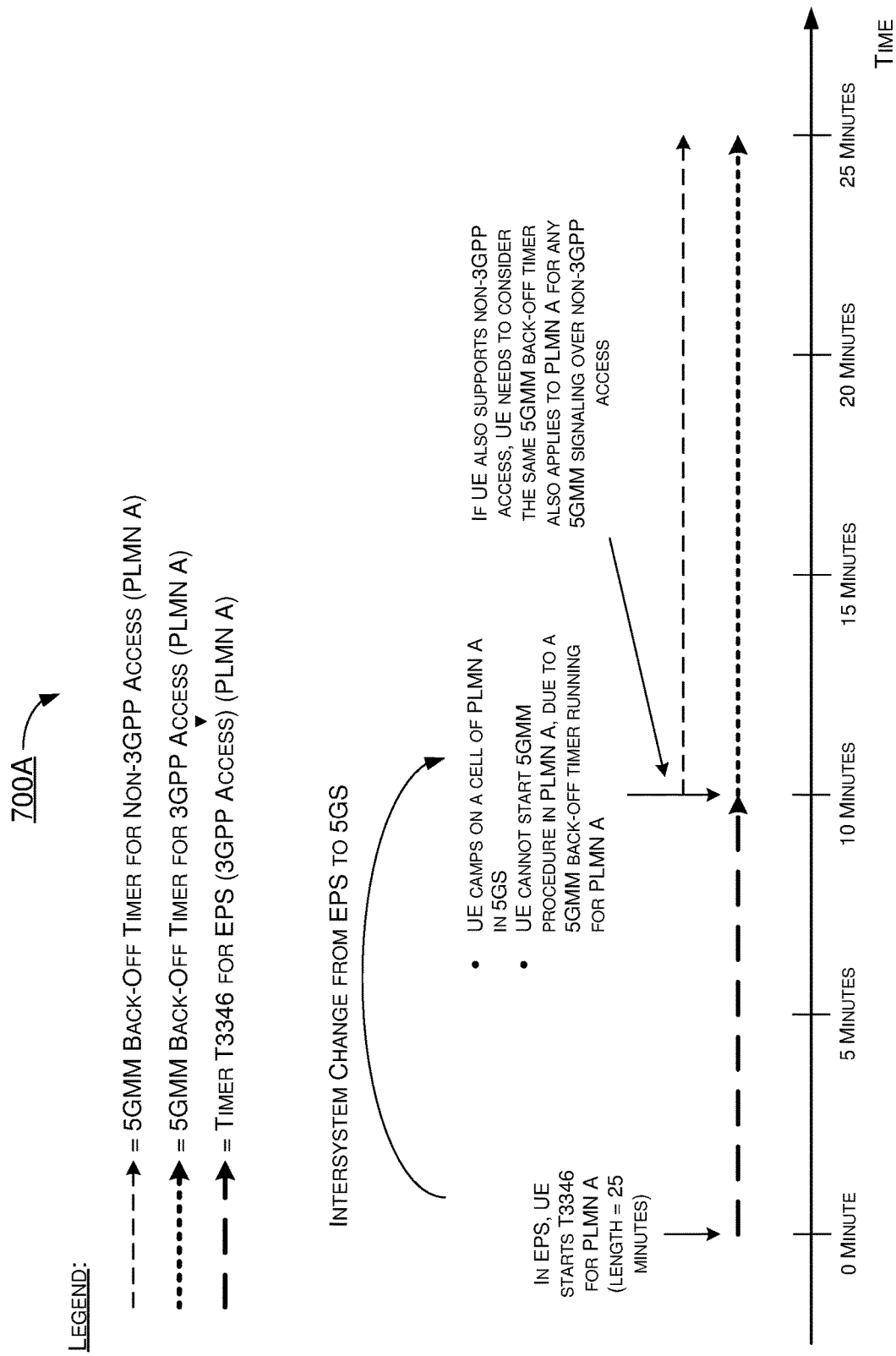
FIG. 7A is a diagram of an example scenario of intersystem change from EPS to 5GS in accordance with an implementation of the present disclosure.

FIG. 7A illustrates an example scenario 700A of intersystem change from EPS to 5GS in accordance with an implementation of the present disclosure. In scenario 700A, in EPS a UE may start a timer T3346 for a first PLMN (denoted as "PLMN A" in FIG. 7A) (e.g., with a length of 25 minutes). As the UE performs an intersystem change from EPS to 5GS, the UE may camp on a cell of PLMN A in 5GS. The UE cannot start 5GMM procedure(s) in PLMN A. The UE needs to consider that a 5GMM back-off timer may still be running for PLMN A. At this time, in the event that the UE also supports non-3GPP access, the UE may need to consider that the same 5GMM back-off timer may apply also to PLMN A for any 5GMM signaling over the non-3GPP access.

FIG. 7B illustrates an example scenario 700B of intersystem change from 5GS to EPS and back to 5GS in accordance with an implementation of the present disclosure. In scenario 700B, in 5GS a UE may start a non-3GPP access 5GMM back-off timer for a second PLMN (denoted as "PLMN B" in FIG. 7B) (e.g., with a length of 19 minutes). As the UE performs an intersystem change from 5GS to EPS, the UE may camp on a cell of PLMN A, receive a reject message, and start a timer T3346 for the PLMN A (e.g., with a length of 25 minutes). Furthermore, if the UE performs an intersystem change from EPS back to 5GS, the UE may camp on a cell of PLMN A in 5GS. The UE cannot start 5GMM procedure(s) in PLMN A. The UE needs to consider that a 5GMM back-off timer may still be running for PLMN A.

Figure 8:
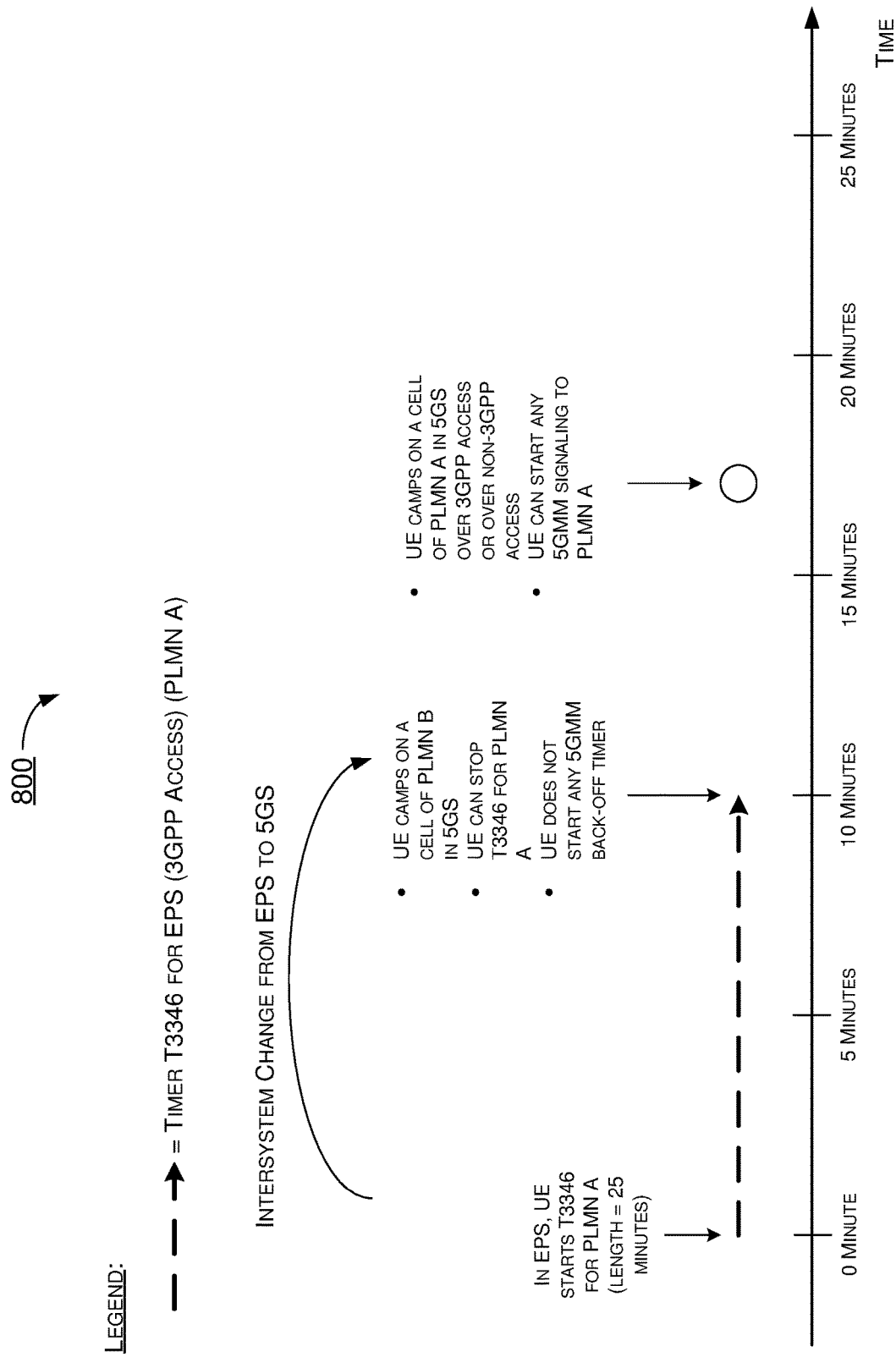
FIG. 8 is a diagram of an example scenario of intersystem change from EPS to 5GS in accordance with an implementation of the present disclosure.

FIG. 8 illustrates an example scenario 800 of intersystem change from EPS to 5GS in accordance with an implementation of the present disclosure. In scenario 800, in EPS a UE may start a timer T3346 for a first PLMN (denoted as "PLMN A" in FIG. 8) (e.g., with a length of 25 minutes). As the UE performs an intersystem change from EPS to 5GS, the UE may camp on a cell of a second PLMN (denoted as "PLMN B" in FIG. 8) in 5GS. The UE may stop timer T3346 running for PLMN A. Moreover, the UE does not start any 5GMM back-off timer. At a later time, the UE may camp on a cell of PLMN A in 5GS over 3GPP access or over non-3GPP access. The UE may start any 5GMM signaling to PLMN A.

Illustrative Implementations

Figure 9:
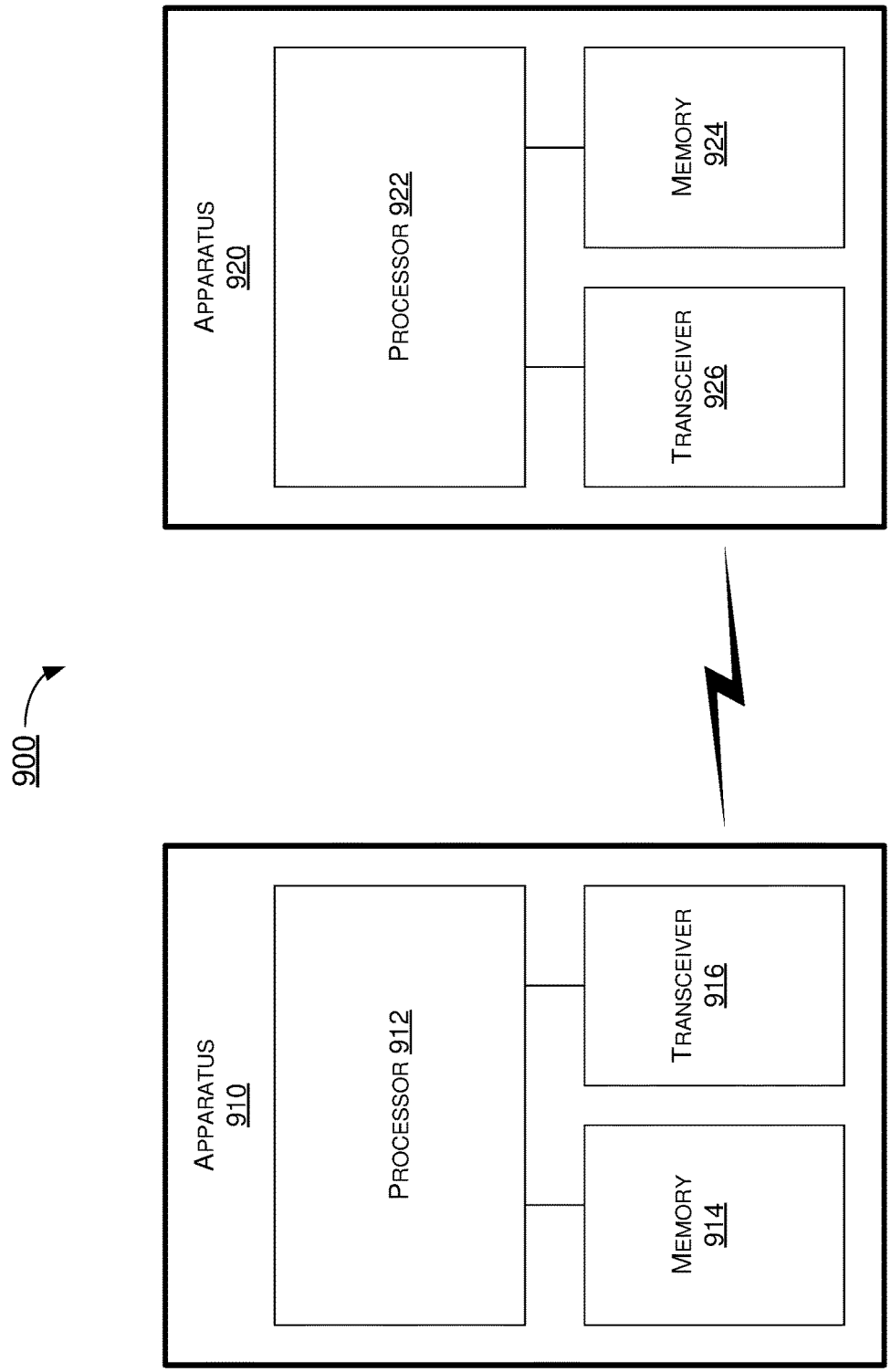
FIG. 9 is a block diagram of an example communication system in accordance with an implementation of the present disclosure.

FIG. 9 illustrates an example system 900 having at least an example apparatus 910 and an example apparatus 920 in accordance with an implementation of the present disclosure. Each of apparatus 910 and apparatus 920 may perform various functions to implement schemes, techniques, processes and methods described herein pertaining to applying NAS-level congestion control timer values at intersystem change in mobile communications, including the various schemes described above with respect to various proposed designs, concepts, schemes, systems and methods described above, including scenarios 100, 200, 300, 400, 500A, 500B, 600A, 600B, 700A, 700B and 800, as well as process 1000 described below.

Each of apparatus 910 and apparatus 920 may be a part of an electronic apparatus, which may be a network apparatus or a UE, such as a portable or mobile apparatus, a wearable apparatus, a wireless communication apparatus or a computing apparatus. For instance, each of apparatus 910 and apparatus 920 may be implemented in a smartphone, a smart watch, a personal digital assistant, a digital camera, or a computing equipment such as a tablet computer, a laptop computer or a notebook computer. Each of apparatus 910 and apparatus 920 may also be a part of a machine type apparatus, which may be an IoT apparatus such as an immobile or a stationary apparatus, a home apparatus, a wire communication apparatus or a computing apparatus. For instance, each of apparatus 910 and apparatus 920 may be implemented in a smart thermostat, a smart fridge, a smart door lock, a wireless speaker or a home control center. When implemented in or as a network apparatus, apparatus 910 and/or apparatus 920 may be implemented in an eNodeB in an LTE, LTE-Advanced or LTE-Advanced Pro network or in a gNB or TRP in a 5G network, an NR network or an IoT network.

In some implementations, each of apparatus 910 and apparatus 920 may be implemented in the form of one or more integrated-circuit (IC) chips such as, for example and without limitation, one or more single-core processors, one or more multi-core processors, or one or more complex-instruction-set-computing (CISC) processors. In the various schemes described above, each of apparatus 910 and apparatus 920 may be implemented in or as a network apparatus or a UE. Each of apparatus 910 and apparatus 920 may include at least some of those components shown in FIG. 9 such as a processor 912 and a processor 922, respectively, for example. Each of apparatus 910 and apparatus 920 may further include one or more other components not pertinent to the proposed scheme of the present disclosure (e.g., internal power supply, display device and/or user interface device), and, thus, such component(s) of apparatus 910 and apparatus 920 are neither shown in FIG. 9 nor described below in the interest of simplicity and brevity.

In one aspect, each of processor 912 and processor 922 may be implemented in the form of one or more single-core processors, one or more multi-core processors, or one or more CISC processors. That is, even though a singular term "a processor" is used herein to refer to processor 912 and processor 922, each of processor 912 and processor 922 may include multiple processors in some implementations and a single processor in other implementations in accordance with the present disclosure. In another aspect, each of processor 912 and processor 922 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 912 and processor 922 is a special-purpose machine specifically designed, arranged and configured to perform specific tasks including those pertaining to applying NAS-level congestion control timer values at intersystem change in mobile communications in accordance with various implementations of the present disclosure.

In some implementations, apparatus 910 may also include a transceiver 916 coupled to processor 912. Transceiver 916 may be capable of wirelessly transmitting and receiving data. In some implementations, transceiver 916 may be capable of wirelessly communicating with different types of wireless networks of different radio access technologies (RATs). In some implementations, transceiver 916 may be equipped with a plurality of antenna ports (not shown) such as, for example, four antenna ports. That is, transceiver 916 may be equipped with multiple transmit antennas and multiple receive antennas for MIMO wireless communications. In some implementations, apparatus 920 may also include a transceiver 926 coupled to processor 922. Transceiver 926 may include a transceiver capable of wirelessly transmitting and receiving data. In some implementations, transceiver 926 may be capable of wirelessly communicating with different types of UEs/wireless networks of different RATs. In some implementations, transceiver 926 may be equipped with a plurality of antenna ports (not shown) such as, for example, four antenna ports. That is, transceiver 926 may be equipped with multiple transmit antennas and multiple receive antennas for MIMO wireless communications.

In some implementations, apparatus 910 may further include a memory 914 coupled to processor 912 and capable of being accessed by processor 912 and storing data therein. In some implementations, apparatus 920 may further include a memory 924 coupled to processor 922 and capable of being accessed by processor 922 and storing data therein. Each of memory 914 and memory 924 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 914 and memory 924 may include a type of read-only memory (ROM) such as mask ROM, programmable ROM (PROM), erasable programmable ROM (EPROM) and/or electrically erasable programmable ROM (EEPROM). Alternatively, or additionally, each of memory 914 and memory 924 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 910 and apparatus 920 may be a communication entity capable of communicating with each other using various proposed schemes in accordance with the present disclosure. For illustrative purposes and without limitation, a description of capabilities of apparatus 910, as a UE, and apparatus 920, as a base station of a serving cell of a wireless network (e.g., 5G/NR mobile network), is provided below. It is noteworthy that, although the example implementations described below are provided in the context of a UE, the same may be implemented in and performed by a base station. Thus, although the following description of example implementations pertains to apparatus 910 as a UE, the same is also applicable to apparatus 920 as a base station (e.g., gNB or TRP).

Under various proposed schemes in accordance with the present disclosure, processor 912 of apparatus 910 may be capable of performing a number of operations, including: (1) receiving, via transceiver 916, an indication of a NAS-level congestion control from a first type of wireless network of different types of wireless networks; (2) starting a timer responsive to the receiving of the indication of the NAS-level congestion control; and (3) performing an intersystem change from the first type of wireless network to a second type of wireless network different from the first type by utilizing the timer.

In some implementations, in starting the timer, processor 912 may be capable of starting a timer which is common for at least the first type and the second type of wireless networks.

In some implementations, the first type of wireless network may include a 5GS network and the second type of wireless network may include a non-5GS network. In such cases, in performing the intersystem change, processor 912 may be capable of performing the intersystem change over a 3GPP access. In some implementations, in starting the timer, processor 912 may be capable of performing one of a plurality of timer-starting procedures. In such cases, in performing the intersystem change, processor 912 may be capable of performing one of a plurality of intersystem changing procedures corresponding to a respective one of the timer-stating procedures.

For instance, a first timer-starting procedure of the plurality of timer-starting procedures may involve processor 912 starting a 5GMM back-off timer. A first intersystem changing procedure of the plurality of intersystem changing procedures which corresponds to the first timer-starting procedure may involve processor 912 starting a back-off timer T3346 for the non-5GS network with a value derived from the 5GMM back-off timer. In such cases, a PLMN selected in the non-5GS network may be the same as or equivalent to a PLMN associated with any 5GMM back-off timer. A second timer-starting procedure of the plurality of timer-starting procedures may involve processor 912 maintaining a back-off timer T3346 for the 3GPP access that is applicable for both the 5GS network and the non-5GS network. A second intersystem changing procedure of the plurality of intersystem changing procedures which corresponds to the second timer-starting procedure may involve processor 912 keeping the back-off timer T3346 running upon completion of the intersystem change from the 5GS network to the non-5GS network. In such cases, a PLMN selected in the non-5GS network may be the same as or equivalent to a PLMN associated with any 5GMM back-off timer. A third timer-starting procedure of the plurality of timer-starting procedures may involve processor 912 starting a non-3GPP instance 5GMM back-off timer. A third intersystem changing procedure of the plurality of intersystem changing procedures which corresponds to the third timer-starting procedure may involve processor 912 starting a back-off timer T3346 for the non-5GS network with a value derived from a remaining value of the non-3GPP instance 5GMM back-off timer. In such cases, a PLMN selected in the non-5GS network may be the same as or equivalent to a PLMN associated with any 5GMM back-off timer.

Alternatively, the second type of wireless network may include a 5GS network and the first type of wireless network may include a non-5GS network. In such cases, in performing the intersystem change, processor 912 may be capable of performing the intersystem change over a 3GPP access. In some implementations, in starting the timer, processor 912 may be capable of performing one of a plurality of timer-starting procedures. In such cases, in performing the intersystem change, processor 912 may be capable of performing one of a plurality of intersystem changing procedures corresponding to a respective one of the timer-stating procedures.

For instance, a first timer-starting procedure of the plurality of timer-starting procedures may involve processor 912 starting a back-off timer T3346 for the non-5GS network. A first intersystem changing procedure of the plurality of intersystem changing procedures which corresponds to the first timer-starting procedure may involve processor 912 starting a 5GMM back-off timer for the 5GS network with a value derived from the back-off timer T3346. In such cases, a PLMN selected in the 5GS network may be the same as or equivalent to a PLMN associated with the back-off timer T3346 started for the non-5GS network. A second timer-starting procedure of the plurality of timer-starting procedures may involve processor 912 starting a back-off timer T3346 for the non-5GS network. A second intersystem changing procedure of the plurality of intersystem changing procedures which corresponds to the second timer-starting procedure may involve processor 912 starting a first 5GMM back-off timer for the 3GPP access and starting a second 5GMM back-off timer for a non-3GPP access. A third timer-starting procedure of the plurality of timer-starting procedures may involve processor 912 starting a back-off timer T3346 which is applicable for both the non-5GS network and the 5GS network. A third intersystem changing procedure of the plurality of intersystem changing procedures which corresponds to the third timer-starting procedure may involve processor 912 starting a 5GMM back-off timer for a non-3GPP access with a remaining value of the back-off timer T3346.

Illustrative Processes

Figure 10:
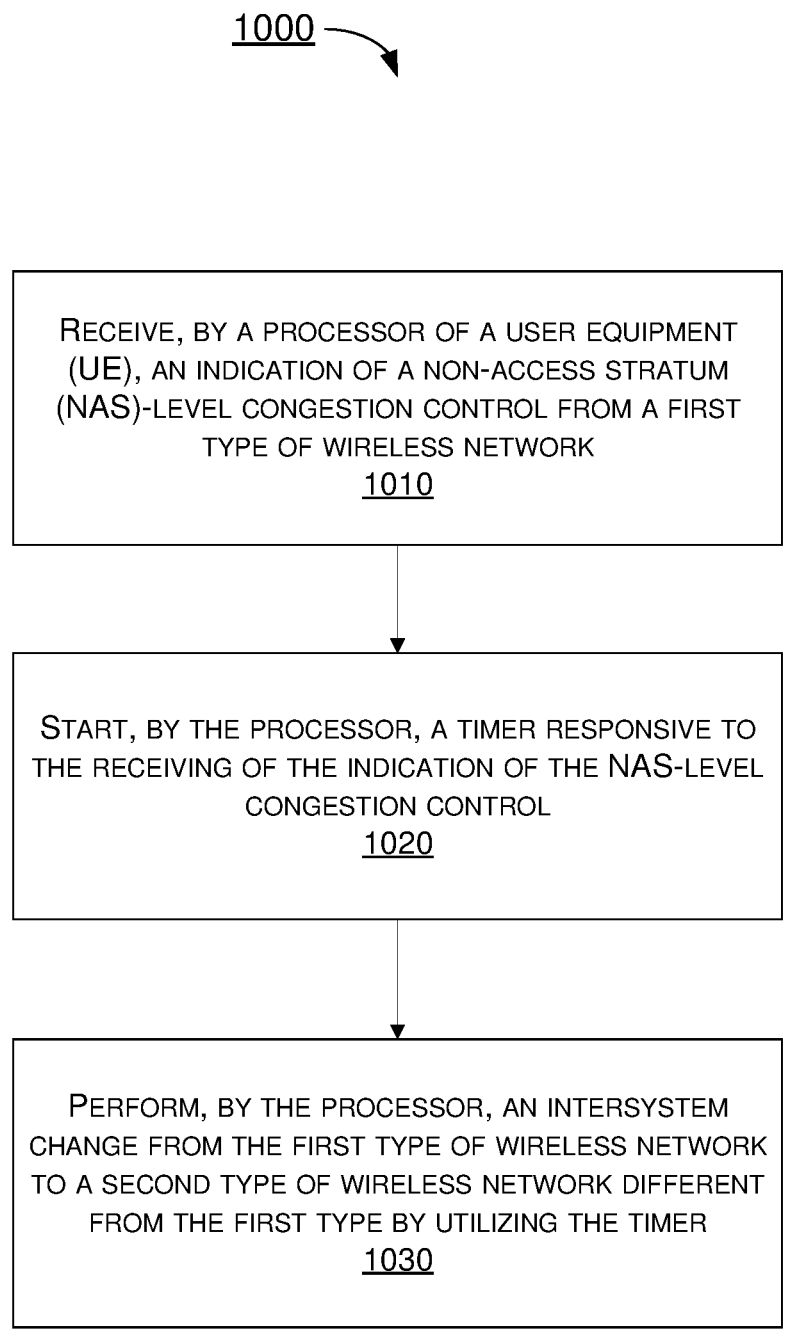
FIG. 10 is a flowchart of an example process in accordance with an implementation of the present disclosure.

FIG. 10 illustrates an example process 1000 in accordance with an implementation of the present disclosure. Process 1000 may represent an aspect of implementing various proposed designs, concepts, schemes, systems and methods described above, whether partially or entirely, including scenarios 100, 200, 300, 400, 500A, 500B, 600A, 600B, 700A, 700B and 800. More specifically, process 1000 may represent an aspect of the proposed concepts and schemes pertaining to applying NAS-level congestion control timer values at intersystem change in mobile communications. Process 1000 may include one or more operations, actions, or functions as illustrated by one or more of blocks 1010, 1020 and 1030. Although illustrated as discrete blocks, various blocks of process 1000 may be divided into additional blocks, combined into fewer blocks, or eliminated, depending on the desired implementation. Moreover, the blocks/sub-blocks of process 1000 may be executed in the order shown in FIG. 10 or, alternatively in a different order. The blocks/sub-blocks of process 1000 may be executed iteratively. Process 1000 may be implemented by or in apparatus 910 and apparatus 920 as well as any variations thereof. Solely for illustrative purposes and without limiting the scope, process 1000 is described below in the context of apparatus 910 as a UE and apparatus 920 as a network node or base station (e.g., gNB, eNB or TRP) of a wireless network (e.g., 5GS or EPS mobile network). Process 1000 may begin at block 1010.

At 1010, process 1000 may involve processor 912 of apparatus 910 receiving, via transceiver 916, an indication of a NAS-level congestion control from a first type of wireless network. Process 1000 may proceed from 1010 to 1020.

At 1020, process 1000 may involve processor 912 starting a timer responsive to the receiving of the indication of the NAS-level congestion control. Process 1000 may proceed from 1020 to 1030.

At 1030, process 1000 may involve processor 912 performing an intersystem change from the first type of wireless network to a second type of wireless network different from the first type by utilizing the timer.

In some implementations, in starting the timer, process 1000 may involve processor 912 starting a timer which is common for at least the first type and the second type of wireless networks.

In some implementations, the first type of wireless network may include a 5GS network and the second type of wireless network may include a non-5GS network. In such cases, in performing the intersystem change, process 1000 may involve processor 912 performing the intersystem change over a 3GPP access. In some implementations, the non-5GS network may include an EPS, a Universal Terrestrial Radio Access Network (UTRAN), or a Global System for Mobile communications (GSM)/Enhanced Data rates for Global Evolution (EDGE) Radio Access Network (GERAN).

In some implementations, in starting the timer, process 1000 may involve processor 912 starting a 5GMM back-off timer. In such cases, in performing the intersystem change, process 1000 may further involve processor 912 starting a back-off timer T3346 for the non-5GS network with a value derived from the 5GMM back-off timer. Moreover, a PLMN selected in the non-5GS network may be the same as or equivalent to a PLMN associated with any 5GMM back-off timer. In some implementations, process 1000 may additionally involve processor 912 receiving an indication that the 5GMM back-off timer is applicable to the non-5GS network in the PLMN selected in the non-5GS network or an equivalent PLMN (ePLMN). In such cases, in starting the back-off timer T3346 for the non-5GS network with the value derived from the 5GMM back-off timer, process 1000 may involve processor 912 starting the back-off timer T3346 with a remaining value of the 5GMM back-off timer. In some implementations, a non-3GPP instance 5GMM back-off timer may remain running when the PLMN selected in the non-5GS network is not the same as or equivalent to a PLMN associated with the non-3GPP instance 5GMM back-off timer.

In some implementations, in starting the timer, process 1000 may involve processor 912 maintaining a back-off timer T3346 for the 3GPP access that is applicable for both the 5GS network and the non-5GS network. In such cases, the back-off timer T3346 may continue running upon completion of the intersystem change from the 5GS network to the non-5GS network. Moreover, a PLMN selected in the non-5GS network may be the same as or equivalent to a PLMN associated with any 5GMM back-off timer.

In some implementations, in starting the timer, process 1000 may involve processor 912 starting a non-3GPP instance 5GMM back-off timer. In such cases, in performing the intersystem change, process 1000 may further involve processor 912 starting a back-off timer T3346 for the non-5GS network with a value derived from a remaining value of the non-3GPP instance 5GMM back-off timer. Moreover, a PLMN selected in the non-5GS network may be the same as or equivalent to a PLMN associated with any 5GMM back-off timer. In some implementations, a 3GPP instance 5GMM back-off timer may remain running when the PLMN selected in the non-5GS network is not the same as or equivalent to a PLMN associated with the 3GPP instance 5GMM back-off timer.

In some implementations, the second type of wireless network may include a 5GS network and the first type of wireless network may include a non-5GS network. In such cases, in performing the intersystem change, process 1000 may involve processor 912 performing the intersystem change over a 3GPP access. In some implementations, the non-5GS network may include an EPS, a UTRAN, or a GERAN.

In some implementations, in starting the timer, process 1000 may involve processor 912 starting a back-off timer T3346 for the non-5GS network. In such cases, in performing the intersystem change, process 1000 may further involve processor 912 starting a 5GMM back-off timer for the 5GS network with a value derived from the back-off timer T3346. Moreover, a PLMN selected in the 5GS network may be the same as or equivalent to a PLMN associated with the back-off timer T3346 started for the non-5GS network. In some implementations, process 1000 may additionally involve processor 912 receiving, via transceiver 916, an indication that the back-off timer T3346 is applicable to the 5GS network in the PLMN selected in the 5GS network or an ePLMN. In such cases, in starting the 5GMM back-off timer for the 5GS network with the value derived from the back-off timer T3346, process 1000 may involve processor 912 starting the 5GMM back-off timer with a remaining value of the back-off timer T3346 running for the non-5GS network.

In some implementations, apparatus 910 may support a non-3GPP access in the 5GS network. In such cases, in starting the timer, process 1000 may involve processor 912 starting a back-off timer T3346 for the non-5GS network. Moreover, in performing the intersystem change, process 1000 may further involve processor 912 starting a first 5GMM back-off timer for the 3GPP access and starting a second 5GMM back-off timer for the non-3GPP access.

In some implementations, apparatus 910 may support a non-3GPP access in the 5GS network. In such cases, in starting the timer, process 1000 may involve processor 912 starting a back-off timer T3346 which is applicable for both the non-5GS network and the 5GS network. Moreover, in performing the intersystem change, process 1000 may further involve processor 912 starting a 5GMM back-off timer for the non-3GPP access with a remaining value of the back-off timer T3346.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    receiving, by a processor of a user equipment (UE), an indication of a non-access stratum (NAS)-level congestion control from a first type of wireless network;
    starting, by the processor, a timer responsive to the receiving of the indication of the NAS-level congestion control; and
    performing, by the processor, an intersystem change from the first type of wireless network to a second type of wireless network different from the first type by utilizing the timer,
    wherein the first type of wireless network comprises a 5th-Generation System (5GS) network and the second type of wireless network comprises a non-5GS network,
    wherein the performing of the intersystem change comprises performing the intersystem change over a 3rd-Generation Partnership Project (3GPP) access,
    wherein the starting of the timer comprises maintaining a back-off timer T3346 for the 3GPP access that is applicable for both the 5GS network and the non-5GS network,
    wherein the back-off timer T3346 continues running upon completion of the intersystem change from the 5GS network to the non-5GS network, and
    wherein a Public Land Mobile Network (PLMN) selected in the non-5GS network is same as or equivalent to a PLMN associated with any 5th-Generation Mobility Management (5GMM) back-off timer.

2. The method of claim 1, wherein the starting of the timer comprises starting a timer which is common for at least the first type and the second type of wireless networks.

3. The method of claim 1, wherein the non-5GS network comprises an Evolved Packet System (EPS), a Universal Terrestrial Radio Access Network (UTRAN), or a Global System for Mobile communications (GSM)/Enhanced Data rates to Global Evolution (EDGE) Radio Access Network (GERAN).

4. The method of claim 1, wherein the starting of the timer comprises starting a 5GMM back-off timer, wherein the performing of the intersystem change further comprises starting the back-off timer T3346 for the non-5GS network with a value derived from the 5GMM back-off timer, and wherein a Public Land Mobile Network (PLMN) selected in the non-5GS network is same as or equivalent to a PLMN associated with any 5GMM back-off timer.

5. The method of claim 4, further comprising:
    receiving, by the processor, an indication that the 5GMM back-off timer is applicable to the non-5GS network in the PLMN selected in the non-5GS network or an equivalent PLMN (ePLMN),
    wherein the starting of the back-off timer T3346 for the non-5GS network with the value derived from the 5GMM back-off timer comprises starting the back-off timer T3346 with a remaining value of the 5GMM back-off timer.

6. The method of claim 5, wherein a non-3GPP instance 5GMM back-off timer remains running when the Public Land Mobile Network (PLMN) selected in the non-5GS network is not same as or equivalent to a PLMN associated with the non-3GPP instance 5GMM back-off timer.

7. The method of claim 1, wherein the starting of the timer comprises starting a non-3GPP instance 5GMM back-off timer, wherein the performing of the intersystem change further comprises starting the back-off timer T3346 for the non-5GS network with a value derived from a remaining value of the non-3GPP instance 5GMM back-off timer, and wherein a Public Land Mobile Network (PLMN) selected in the non-5GS network is same as or equivalent to a PLMN associated with any 5GMM back-off timer.

8. The method of claim 7, wherein a 3GPP instance 5GMM back-off timer remains running when the PLMN selected in the non-5GS network is not the same as or equivalent to a PLMN associated with the 3GPP instance 5GMM back-off timer.

9. A method, comprising:
    receiving, by a processor of a user equipment (UE), an indication of a non-access stratum (NAS)-level congestion control from a first type of wireless network;
    starting, by the processor, a timer responsive to the receiving of the indication of the NAS-level congestion control; and
    performing, by the processor, an intersystem change from the first type of wireless network to a second type of wireless network different from the first type by utilizing the timer,
    wherein the second type of wireless network comprises a 5th-Generation System (5GS) network and the first type of wireless network comprises a non-5GS network,
    wherein the performing of the intersystem change comprises performing the intersystem change over a 3rd-Generation Partnership Project (3GPP) access,
    wherein the starting of the timer comprises starting a back-off timer T3346 for the non-5GS network,
    wherein the performing of the intersystem change further comprises starting a 5th-Generation Mobility Management (5GMM) back-off timer for the 5GS network with a value derived from the back-off timer T3346, and
    wherein a Public Land Mobile Network (PLMN) selected in the 5GS network is same as or equivalent to a PLMN associated with the back-off timer T3346 started for the non-5GS network.

10. The method of claim 9, wherein the non-5GS network comprises an Evolved Packet System (EPS), a Universal Terrestrial Radio Access Network (UTRAN), or a Global System for Mobile communications (GSM)/Enhanced Data rates for Global Evolution (EDGE) Radio Access Network (GERAN).

11. The method of claim 9, further comprising:
    receiving, by the processor, an indication that the back-off timer T3346 is applicable to the 5GS network in the PLMN selected in the 5GS network or an equivalent PLMN (ePLMN), wherein the starting of the 5GMM back-off timer for the 5GS network with the value derived from the back-off timer T3346 comprises starting the 5GMM back-off timer with a remaining value of the back-off timer T3346 running for the non-5GS network.

12. The method of claim 9, wherein the UE supports a non-3GPP access in the 5GS network, and wherein the performing of the intersystem change further comprises starting a first 5th-Generation Mobility Management (5GMM) back-off timer for the 3GPP access and starting a second 5GMM back-off timer for the non-3GPP access.

13. The method of claim 9, wherein the UE supports a non-3GPP access in the 5GS network, wherein the back-off timer T3346 is applicable for both the non-5GS network and the 5GS network, and wherein the performing of the intersystem change further comprises starting a 5th-Generation Mobility Management (5GMM) back-off timer for the non-3GPP access with a remaining value of the back-off timer T3346.

14. A method, comprising:
receiving, by a processor of a user equipment (UE), an indication of a non-access stratum (NAS)-level congestion control from a first type of wireless network;
starting, by the processor, a timer responsive to the receiving of the indication of the NAS-level congestion control; and
performing, by the processor, an intersystem change from the first type of wireless network to a second type of wireless network different from the first type by utilizing the timer,
wherein the starting of the timer comprises starting a 5th-Generation Mobility Management (5GMM) back-off timer,
wherein the performing of the intersystem change further comprises starting a back-off timer T3346 for the non-5GS network with a value derived from the 5GMM back-off timer, and
wherein a Public Land Mobile Network (PLMN) selected in the non-5GS network is same as or equivalent to a PLMN associated with any 5GMM back-off timer.

15. The method of claim 14, wherein the starting of the timer comprises starting a timer which is common for at least the first type and the second type of wireless networks.

16. The method of claim 14, further comprising:
receiving, by the processor, an indication that the 5GMM back-off timer is applicable to the non-5GS network in the PLMN selected in the non-5GS network or an equivalent PLMN (ePLMN),
wherein the starting of the back-off timer T3346 for the non-5GS network with the value derived from the 5GMM back-off timer comprises starting the back-off timer T3346 with a remaining value of the 5GMM back-off timer.

17. The method of claim 16, wherein a non-3GPP instance 5th-Generation Mobility Management (5GMM) back-off timer remains running when the Public Land Mobile Network (PLMN) selected in the non-5GS network is not same as or equivalent to a PLMN associated with the non-3GPP instance 5GMM back-off timer.

18. The method of claim 14, wherein the starting of the timer comprises starting a non-3GPP instance 5th-Generation Mobility Management (5GMM) back-off timer, wherein the performing of the intersystem change further comprises starting the back-off timer T3346 for the non-5GS network with a value derived from a remaining value of the non-3GPP instance 5GMM back-off timer, and wherein a Public Land Mobile Network (PLMN) selected in the non-5GS network is same as or equivalent to a PLMN associated with any 5GMM back-off timer.

19. A method, comprising:
receiving, by a processor of a user equipment (UE), an indication of a non-access stratum (NAS)-level congestion control from a first type of wireless network;
starting, by the processor, a timer responsive to the receiving of the indication of the NAS-level congestion control; and
performing, by the processor, an intersystem change from the first type of wireless network to a second type of wireless network different from the first type by utilizing the timer,
wherein the second type of wireless network comprises a 5th-Generation System (5GS) network and the first type of wireless network comprises a non-5GS network,
wherein the performing of the intersystem change comprises performing the intersystem change over a 3rd-Generation Partnership Project (3GPP) access,
wherein the UE supports a non-3GPP access in the 5GS network,
wherein the starting of the timer comprises starting a back-off timer T3346 for the non-5GS network, and
wherein the performing of the intersystem change further comprises starting a first 5th-Generation Mobility Management (5GMM) back-off timer for the 3GPP access and starting a second 5GMM back-off timer for the non-3GPP access.

20. A method, comprising:
receiving, by a processor of a user equipment (UE), an indication of a non-access stratum (NAS)-level congestion control from a first type of wireless network;
starting, by the processor, a timer responsive to the receiving of the indication of the NAS-level congestion control; and
performing, by the processor, an intersystem change from the first type of wireless network to a second type of wireless network different from the first type by utilizing the timer,
wherein the second type of wireless network comprises a 5th-Generation System (5GS) network and the first type of wireless network comprises a non-5GS network,
wherein the performing of the intersystem change comprises performing the intersystem change over a 3rd-Generation Partnership Project (3GPP) access,
wherein the UE supports a non-3GPP access in the 5GS network,
wherein the starting of the timer comprises starting a back-off timer T3346 which is applicable for both the non-5GS network and the 5GS network, and
wherein the performing of the intersystem change further comprises starting a 5th-Generation Mobility Management (5GMM) back-off timer for the non-3GPP access with a remaining value of the back-off timer T3346.

* * * * *